(12) United States Patent
Cardin

(10) Patent No.: US 8,985,514 B2
(45) Date of Patent: Mar. 24, 2015

(54) COMPOSITE STRUCTURAL PANELS AND AIRCRAFT FUSELAGES

(75) Inventor: Rachel Cardin, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 13/528,553

(22) Filed: Jun. 20, 2012

(65) Prior Publication Data

US 2014/0224932 A1    Aug. 14, 2014

(51) Int. Cl.
*B64C 1/12* (2006.01)
*B29D 99/00* (2010.01)
*B32B 3/06* (2006.01)
*B64C 1/06* (2006.01)
*B64C 1/00* (2006.01)

(52) U.S. Cl.
CPC ............... *B64C 1/12* (2013.01); *B29D 99/001* (2013.01); *B32B 3/06* (2013.01); *B64C 2001/0072* (2013.01); *Y02T 50/433* (2013.01); *B64C 1/069* (2013.01); *Y02T 50/43* (2013.01)
USPC .............................. 244/131; 244/120; 244/132

(58) Field of Classification Search
CPC .......... B64C 1/12; B64C 1/068; B64C 1/069; B64C 2001/0072
USPC .......... 244/119, 120, 123.2, 123.4, 124, 131, 244/132
See application file for complete search history.

(56) References Cited

U.S. PATENT DOCUMENTS

| | | | |
|---|---|---|---|
| 6,276,634 B1 * | 8/2001 | Bodle | 244/118.5 |
| 7,879,177 B2 | 2/2011 | McCowin et al. | |
| 8,061,035 B2 | 11/2011 | Stulc et al. | |
| 8,157,212 B2 | 4/2012 | Biornstad et al. | |
| 2008/0111026 A1 * | 5/2008 | Stulc et al. | 244/131 |
| 2010/0237194 A1 * | 9/2010 | Stephan | 244/131 |
| 2010/0272954 A1 * | 10/2010 | Roming et al. | 428/138 |
| 2010/0300027 A1 * | 12/2010 | Bravo et al. | 52/311.1 |
| 2014/0131513 A1 * | 5/2014 | Bjerkemo | 244/1 A |

* cited by examiner

*Primary Examiner* — Brian M O'Hara
*Assistant Examiner* — Christopher Hutchens
(74) *Attorney, Agent, or Firm* — DASCENZO Intellectual Property Law, P.C.

(57) ABSTRACT

Structural panel assemblies include first and second composite panels positioned in edgewise alignment, with at least one tab extending from a mating edge of the first panel and including an exterior surface in facing registration with a corresponding portion of an interior surface of the second composite panel. The corresponding portion includes a recessed area to interfit with the tab or is otherwise configured to receive the tab. The exterior surface of the tab is spaced from the corresponding portion, to receive a bonding material therebetween for bonding the composite panels.

17 Claims, 4 Drawing Sheets

COMPOSITE STRUCTURAL PANELS AND AIRCRAFT FUSELAGES

FIELD

The present disclosure relates to shell structures, and more particularly to methods of joining composite structural panels and sections, and structural assemblies formed according to such methods.

BACKGROUND

The primary structural elements of many aircraft, typically larger aircraft such as large passenger jets, are often made from metal. Fuselage shells and sections for such aircraft, for example, are typically manufactured from high-strength aluminum alloys or similar metals. Recently, however, many aircraft manufacturers have begun using composite materials, such as fiber-reinforced resin materials, for the relatively high strength-to-weight ratios of such materials. Suitable composite materials usually include glass, carbon, or synthetic (e.g. polyamide, polyester, etc.) fibers in a matrix of epoxy or another type of resin.

One example method of manufacturing aircraft fuselages with composite materials involves wrapping fibers or fiber tapes around a rotating mandrel, generally with an automated instrument or system. The mandrel provides the basic shape of a longitudinal fuselage section. The fibers or tapes may be pre-impregnated with an epoxy, or passed through a resin bath just before the material contacts the rotating mandrel, and are applied in multiple plies to form a skin of a fuselage section. In some techniques, the mandrel can remain in place and become part of the wound component, or it can be removed. The skin may be covered with additional layers, such as a layer of honeycomb core, to which additional plies of composite materials may be applied in a composite "sandwich" structure.

One way in which composite fuselage sections formed in this manner are joined together involves the use of one or more splice plates that are fastened in place over a circumferential splice joint between adjacent fuselage sections. In general, a splice plate is held in place while attachment holes are precisely drilled through the splice plate and underlying composite structure. Each hole is usually probed for size quality, such as through the use of a machine that may also record statistical process control data on each hole. Fasteners are then applied according to precisely measured torques, securing the plate in place.

For larger aircraft, such as widebody aircraft, a compound splice plate system may be used. Typically, a system of structural beams such as longitudinal stiffeners and lateral frames are attached to the fuselage sections for reinforcement. A compound splice plate system may involve splice plates having longitudinal extensions positioned along the splice plate to extend to the regions on either side of the splice plate between adjacent stiffeners, and/or separate longitudinal fittings that are fastened cross-wise to the splice plate to extend to either side and in between adjacent stiffeners. The extensions and/or fittings are fastened to the composite structure in a similar manner as the splice plate. In some cases, the extensions or fittings are provided with orthogonal flanges, such as for additional rigidity, which may themselves be attached to stiffeners and/or frames.

Methods of splice plate joining of composite fuselage sections thus can involve labor-intensive assembly procedures and extensive tooling fixtures, especially in widebody aircraft. For example, the inner diameter of the fuselage in widebody aircraft is typically around 200 inches (around 5 meters). The number of fasteners required for joining adjacent fuselage sections of this size can exceed 5,000. Even with automation, the time required to drill the requisite number of holes and properly apply the fasteners can be over 400 man-hours per section. Moreover, widebody aircraft fuselages are assembled from several fuselage sections—for example, the Boeing 787 Dreamliner is assembled from five fuselage sections. As such, the aforementioned joining technique for the fuselage sections for this size and type of aircraft can represent a demand for a fastener count exceeding 20,000, and over 2,000 man-hours.

SUMMARY

The present disclosure describes composite structural panels and methods of joining the same to form structural assemblies such as shell structures.

As explained in greater detail herein, composite panel assemblies in accordance with the present disclosure may include first and second composite panels having corresponding mating edges positioned in relative edgewise alignment, with at least one tab (and, in some embodiments, a plurality of tabs) extending longitudinally from the mating edge of the first composite panel, and each tab including an exterior surface in facing registration with a corresponding portion of an interior surface of the second composite panel. The corresponding portion may include a recessed area to interfit with the tab or be otherwise configured to closely space the facing surfaces of the tabs and corresponding portions. The tabs may include one or more injection holes for injection of a bonding material into this space, and further may include one or more verification holes disposed proximate the injection hole(s) to verify injection of the bonding material. As such, the assemblies may include a bonding material bonding the first and second panels together.

Some embodiments may include additional configurations and/or features, such as may be appropriate to the nature of the structural panels. For example, aircraft fuselage sections typically include a number of structural components fastened to the interior surface thereof, usually in the form of elongate reinforcing beams running longitudinally (such as parallel to a central axis of the fuselage) and/or laterally (such as extending partway around a central axis of the fuselage). Longitudinal beams are referred to as stringers or stiffeners, and lateral beams are referred to as frames. Accordingly, in some embodiments in which one or more structural components are mounted to the interior surface of one or both structural panels, the tabs may be sized or shaped accordingly. For example, in some embodiments, the tabs may have a width sized to fit between end portions of adjacent longitudinal beams. In some embodiments, the tabs may be configured to interfit with a portion of one or more structural components, such as having a distal end or edge portion adapted to fit with a flange on the side of a lateral beam.

In some embodiments, the structural composite panels may form skin sections for an aircraft, such as a fuselage sections, or entire barrel sections, that may be joined together by use of the tabs and bonding material.

Example methods of forming an aircraft fuselage according to the present disclosure, such as by joining aircraft fuselage sections fabricated from composite materials, may include fitting a first fuselage section with tabs extending longitudinally from a mating edge thereof, and configuring a second fuselage section with a corresponding mating edge adapted to matingly receive the tabs and mating edge of the first fuselage section. The mating edges of the first and second fuselage sections may be engaged in edgewise alignment, and a bonding material may then be used to bond the fuselage sections together (such as by injecting bonding material through injection holes provided in the tabs). In some example methods, the tabs are formed as separate components, such as from composite materials, and then are incorporated into the first fuselage section, such as while it is formed. In some methods, the tabs may be integral with the first fuselage section.

DESCRIPTION

The example embodiments of structural assemblies of composite panels and sections disclosed and illustrated herein may find application in various aspects of vehicle design, including (but not limited to) forming an aircraft fuselage from composite barrel sections that are configured and joined together as described below.

In general, composite structural panels configured according to the present disclosure may be joined by means of tabs extending longitudinally from a mating edge of one panel that are bonded to a correspondingly configured portion of the other panel. This configured portion may be an interior surface configured to receive the tab, a structural element with which the tab interfits, a combination thereof, and so forth.

In the specific context of an aircraft shell structure such as a fuselage, joining composite fuselage sections in this manner may reduce the labor and/or the part count typically required to achieve a suitable joint, for example as compared to a joint achieved by means of a splice joint technique.

The present disclosure also provides example methods by which the structural composite panels briefly described above may be produced and/or joined.

Figure 1:
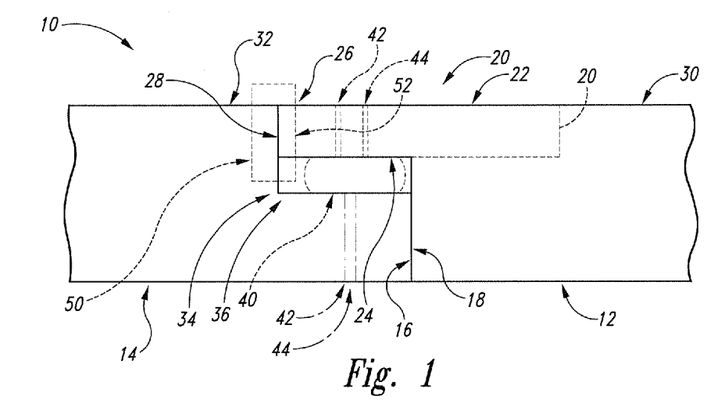
FIG. 1 is a schematic, cross-sectional view representing structural panel assemblies in accordance with the present disclosure.

FIG. 1 is a schematic, cross-sectional view representing illustrative, non-exclusive examples of a structural panel assembly 10 in accordance with the present disclosure. In general, a structural panel assembly 10 includes first and second composite panels 12, 14, each of which are provided with a mating edge (indicated at 16, 18, respectively). The first and second composite panels 12, 14 are positioned in edgewise alignment with each other; that is, with mating edges 16, 18 aligned. At least portions of the mating edges 16, 18 may be in contact with each other, and as explained below, other portions of the mating edges 16, 18 may be spaced from each other when the first and second composite panels 12, 14 are edgewise aligned.

The first composite panel 12 includes at least one tab 20 extending longitudinally therefrom, and specifically from the mating edge 16 thereof. "Longitudinally" indicates that the tab extends generally along an axis or plane of the composite panel 12. As explained below, in some examples, the composite panels 12, 14 may form skin sections, or barrel sections, of an aircraft, in which "longitudinal" may indicate that the tab extends parallel to a long axis of the aircraft or aircraft fuselage (as opposed to "lateral" or "radial," which may indicate a direction or disposition generally orthogonal to the long axis of the aircraft or fuselage). However, such terms are not to be construed in a limiting sense, but for the sake of clarity of explanation.

Tab 20, also referred to herein as a bonding tab, has a top or interior surface 22, a bottom or exterior surface 24, and a distal end 26 that terminates in a distal edge 28. In the context of an aircraft fuselage, a fuselage typically at least partially defines a volume, and although "interior" and "exterior" generally indicate the disposition of a component relative to that volume, the terms are employed for the sake of explanation. For example, in some embodiments, a component or part thereof that is described as "interior" may, in other embodiments, be "exterior," and vice versa.

As explained in greater detail below, the physical configuration of the bonding tab 20 may vary among examples consistent with this disclosure, and may include optional features or characteristics (such as a lip or other protrusion, and so forth) not indicated in the schematic view shown in FIG. 1.

Further, bonding tab 20 may be an extension of (e.g. integral with) first composite panel 12, or may be a separate component that is coupled to panel 12. The latter construction is indicated in dashed lines, indicating an optional perimeter or edge of bonding tab 20. As explained below, different methods of fabrication may be employed to assemble tab 20 to panel 12. Moreover, as shown in FIG. 1, the interior surface 22 of tab 20 is indicated to be flush with a top or interior surface 30 of the first composite panel 12. However, this is not required to all embodiments; as described in greater detail below, in some embodiments, all surfaces of tab 20 may project from the mating edge 16 of first composite panel 12, whereas in other embodiments, the interior surface 22 of tab 20 may project above, be inclined relative to, or be disposed in other alignments to, the interior surface 30 of the first composite panel 12.

The mating edge 18 of second composite panel 14 is configured to correspond to the mating edge 16 of the first composite panel 12. The second composite panel 14 further includes an upper or interior surface 32 that includes at least one corresponding portion, indicated at 34, that complements and/or otherwise corresponds to tab 20, such as by including a recessed area 36 adapted to at least partially interfit with the tab 20. Similar to the physical configuration of the bonding tab 20, that of the corresponding portion 34 (and/or recessed area 36) may include optional features or characteristics (such as a channel to receive a lip, and so forth) not indicated in the schematic view shown in FIG. 1.

In the above-described manner, the mating edge 18 of second composite panel 14 is configured to matingly receive or otherwise fit with the mating edge 16 of the first composite panel 12. As shown, when mated, at least portions of the mating edges 16, 18 may abut each other, whereas other portions may be spaced; for example, the exterior surface 24 of the tab 20 and the corresponding portion 34 of the interior surface 30 of the second composite panel 14 are spaced, and may receive a bonding material, shown as bonding material 40, therebetween. The bonding material 40 may be any material, or materials, configured to form a bond between the respective surfaces, thereby bonding the first and second composite panels 12, 14 together. Accordingly, the bonding material 40 may include an adhesive agent such as an epoxy, or other compound(s) compatible with the material(s) from which the respective surfaces to be bonded are formed.

To facilitate the introduction of bonding material 40, such as in a flowable form, tab 20 may be provided with one or more injection holes 42 extending from the interior surface 22 to the exterior surface 24, through which a bonding material (such as bonding material 40) may be injected. To verify the injection of bonding material 40, tab 20 may further be provided with one or more verification holes 44 also extending through the tab 20, and disposed proximate to injection hole(s) 42. The size and configuration of the injection hole(s) 42 and verification hole(s) 44 may be suitable to the application. For example, the injection hole(s) 42 may have a diameter or shape corresponding to the technique of injection, such as to accommodate the nozzle of an injection tool or instrument, and so forth. Likewise, the verification hole(s) 44 may have a diameter or shape corresponding to the verification technique, such as to allow optical verification, mechanical verification (such as with a probe), and so forth.

Optionally, the injection hole(s) 42 and verification hole(s) 44 may be configured similarly, so that either type may be used for injection and/or verification, which may facilitate injection and subsequent verification in a number of different orientations of the adjoined composite panels 12, 14. For example, if the orientation of the panels 12, 14 is generally horizontal, bonding material will typically (but is not required to) spread outward from an injection site, in which case a centrally-located injection hole 42 may be used for injection and one or more surrounding verification holes 44 may be used for verification. In an example in which the orientation of panels 12, 14 is generally vertical or otherwise upright, gravity may influence the flow of injected bonding material, in which case it may be suitable to use one or more of the uppermost holes 42, 44 as the injection hole 42, and lower holes as verification holes 44 to verify injection, and so forth.

Further, the number and disposition of the injection hole(s) 42 and accompanying verification hole(s) 44 on a tab 20 may be according to a spacing that corresponds to the expected flow of a quantity of bonding material 40 that is appropriate to the application, which may depend on factors such as the size of the areas of the tab 20 and/or corresponding portion 32 to be bonded, the dimension of the spacing therebetween, the nature of the bonding material 40, such as its viscosity, cure time, and/or other properties, and so forth. In some examples, a single injection hole 42 is surrounded by a more or less equidistant plurality of verification holes 44 in a pattern that is repeated at measured intervals across the width of a tab 20. However, any desired arrangement of injection hole(s) 42 and verification hole(s) 44 may be employed.

In some embodiments, one or more injection holes 42 and/or verification holes 44 may be optionally provided on the second composite panel 14, as shown in a second style of dashed lines in FIG. 1.

Optionally, and as explained in greater detail herein, the second composite panel 14 (and/or the first composite panel 12) may have one or more structural components mounted thereto, such as may be appropriate to the application in which the first and second composite panels 12, 14 are used. For example, in the context of an aircraft fuselage, structural components may include reinforcing beams such as stiffeners and/or frames, and so forth. A structural component is schematically indicated in FIG. 1 at 50 in dashed lines, in an overlapping relationship with portions of composite panels 12 and 14, representing that such a structural component may be attached to, coupled with, interfit with, and/or otherwise interface with one or more portions of one or both panels 12, 14. For example, in some embodiments, structural component 50 may include one or more portions 52 configured to interfit with part of the tab 20, such as the distal end 26 or edge 28 thereof.

Although not shown in FIG. 1, the bond provided by the bonding material 40 may be supplemented, such as with additional bonding regions (for example between other mating surfaces of the composite panels 12, 14), one or more mechanical fasteners such as rivets, screws, bolts, and so forth. Optionally, the bond may be supplemented by a mechanical interfit achieved by a suitable configuration of the tab 20 and the corresponding portion 34. Example configurations are discussed herein with reference to FIGS. 2-5.

Mating edge 16 of the first composite panel 12 is illustrated to include one tab 20. Correspondingly, mating edge 18 of the second composite panel 14 is illustrated to include one corresponding portion 34. In many embodiments, the mating edges 16, 18 include multiple iterations of tabs 20 and corresponding portions 34, which in turn may be configured similarly to each other, in terms of dimensions, details, and other features, or may differ. For example, a first composite panel 12 may include a plurality of tabs 20 of differing widths, and a second composite panel 14 may include a corresponding plurality of corresponding portions 34 dimensioned accordingly, and so forth.

Moreover, some example embodiments include a first composite panel 12 having a mating edge 16 that includes one or more tabs 20 and also one or more corresponding portions 34, such as to mate with a second composite panel 14 that includes a corresponding configuration of tabs 20 and portions 34. Further, composite panels may include more than one mating edge, which may be configured with any suitable combination of tabs, portions, or other structural features adapted to allow the composite panels to mate in edgewise alignment according to the principles discussed herein. All of such configurations are considered to be within the scope of this disclosure.

Figure 2:
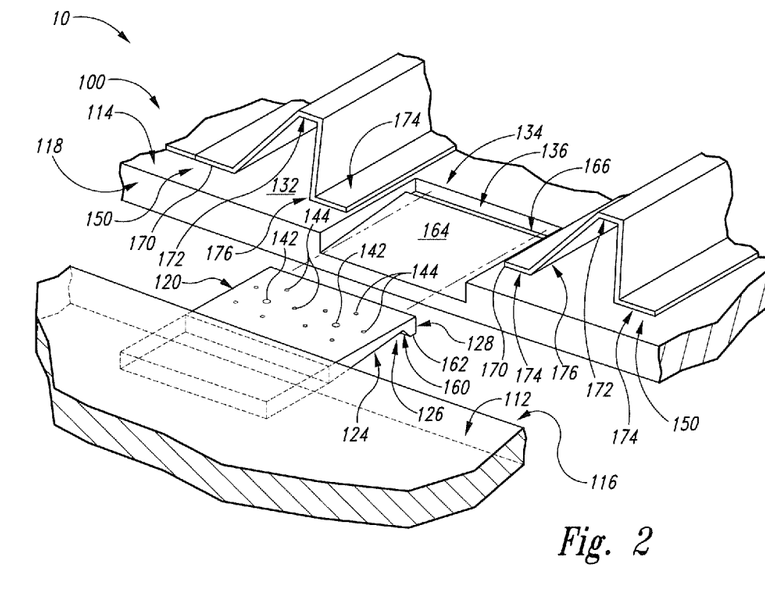
FIG. 2 is a partially schematic, partially-exploded, oblique view of an illustrative, non-exclusive example of a structural panel assembly in accordance with the present disclosure.

Turning now to FIGS. 2-5, illustrative non-exclusive examples of composite panels and assemblies and/or components thereof are illustrated. Where appropriate, the reference numerals from the schematic illustrations of FIG. 1 are reiterated, in increments of 100, to designate corresponding parts of the composite panel structures, the assemblies thereof, and/or their components. For example, the first and second composite panels represented schematically in FIG. 1 are marked with reference numbers 12 and 14, respectively. FIG. 2 represents composite panels in the form of skin sections, which are marked with reference numbers 112 and 114, respectively, indicating that the skin sections shown in FIG. 2 share properties of or otherwise correspond to the composite panels 12, 14 shown in FIG. 1. Similarly, the skin sections 212, 214 in FIG. 3 correspond to composite panels 12, 14 of FIG. 1, and so forth.

The examples of FIGS. 2-5 are non-exclusive and do not limit the possible configurations to the illustrated embodiments. That is, the composite panels and various components, assemblies, configurations, and other characteristics thereof are not limited to the specific embodiments, and may incorporate any number of the various aspects, configurations, characteristics, properties, etc. of the composite panel structures that are illustrated in and discussed with reference to the schematic representations and/or the embodiments of FIG. 1, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to later-discussed embodiments, however, it is within the scope of the present disclosure that the previously discussed features, variants, etc. may be utilized with any or all of the composite panels and structural assemblies described herein.

FIG. 2 is a partially schematic, partially-exploded, interior view of an illustrative, non-exclusive embodiment of structural panel assembly 10 in accordance with the present disclosure. The structural panel assembly 10 in FIG. 2, and the illustrated components thereof, are shown in the form and configuration of an example aircraft fuselage assembly, indicated generally at 100. However, it is intended that the concepts and configurations described below are applicable to shell structures other than aircraft fuselage assemblies, for example other aircraft shell structures such as wing structures, shell structures for other vehicles, and so forth. Such applications are considered to be within the scope of this disclosure.

Accordingly, aircraft fuselage assembly 100 is shown to include first and second skins, or skin sections, 112, 114, which are each formed, at least partially, of a plurality of plies of composite materials. Accordingly, the skin sections 112, 114 may be fuselage sections, such as barrel sections, with each section formed with composite and/or other materials in a "sandwich" structure, or otherwise. Herein, the term "barrel section" refers to a shell structure that extends 360 degrees around an axis (for example, the longitudinal axis of an aircraft fuselage), and thus includes not only cylindrical structures and structures having barrel shapes, but can include structures having circular, elliptical, oval, egg-shaped, rectilinear, tapered, or other cross-sectional shapes. In some embodiments, one or both of the skin sections 112, 114 may be "one-piece" barrel sections extending continuously for 360 degrees around the axis. In some embodiments, the skin sections 112, 114 may be half- or quarter-sections (or otherwise) joined together to form a full 360-degree barrel section, and so forth.

As such, in the example aircraft fuselage assembly 100 shown in FIG. 2, the skin sections 112, 114 may be concave in overall configuration, for example to an extent suitable to form an aircraft fuselage having a particular cross-sectional width, typically of at least about 120 inches (approximately 3 meters), for example about 180 inches (approximately 4.5 meters) to about 360 inches (approximately 9 meters). In one example, such as for a widebody aircraft, the cross-sectional width can be about 200 inches (approximately 5 meters).

First skin section 112 includes a tab 120 extending longitudinally from a mating edge 116 of the skin section 112. In aircraft fuselage assembly 100, tab 120 is one of a plurality (not shown) of such tabs, disposed along and extending from the mating edge 116 in a manner similar to the illustrated tab 120.

Although other configurations are possible, tab 120 is shown to include, on an exterior surface 124 thereof, a protrusion 160 extending substantially orthogonally therefrom. In particular, the protrusion 160 is shown to form a lip 162 disposed on a distal end 126 of the tab 120, and more specifically on a distal edge 128 thereof.

The interior surface 132 of the second skin section 114 is shown to include a portion 134 configured to correspond with the exterior surface 124 of tab 120, in the form of a recessed area 136. More specifically, the recessed area 136 is configured to at least partially interfit with tab 120, with the exterior surface 124 thereof in facing registration with the corresponding portion 134. In particular, with additional reference to FIG. 3, the recessed area 136 of portion 134 of second skin 114 may be thought of as including a bonding surface, indicated at 164, that is spaced from the exterior surface 124 of the bonding tab 120 when the mating edge 116 of the first skin 112 and a corresponding mating edge 118 of the second skin 114 are in alignment. As noted above, the dimension of the spacing may be suitable to accommodate a bonding material (not shown) introduced between the spaced surfaces. In some examples, the surfaces to be bonded may be spaced by a distance greater than about 0.020 inches (approximately 0.5 mm), such as within a range of 0.020 inches to 0.100 inches (approximately 0.5 mm to 2.5 mm) for example about 0.050 inches (approximately 1.3 mm). However, in other examples, the respective bonding surfaces may be spaced according to different values, ranges, or may vary throughout a range, and so forth.

Figure 3:
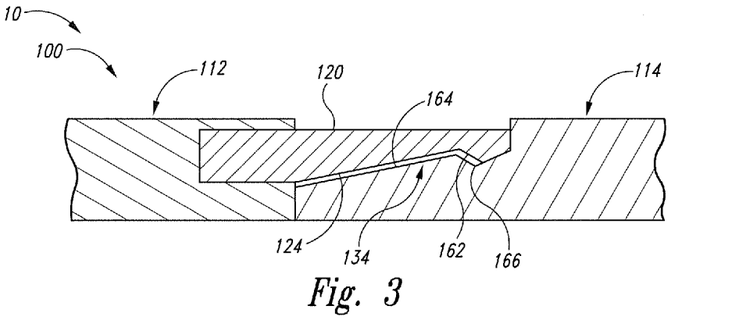
FIG. 3 is a partially schematic, cross-sectional view of the example composite panel and bonding tab configuration of the structural panel assembly of FIG. 2.

Moreover, although not required to all embodiments, the recessed area 136 of the example aircraft fuselage assembly 100 of FIGS. 2 and 3 is shown to be configured to interfit with the tab 120, and in particular with the lip 162 disposed thereon, in a snap fit engagement, such as by including a shallow channel 166 configured to accept the lip 162.

Thus, in an example method of engaging the tab 120 of the first skin section 112 with the corresponding portion 134 of the second skin section 114, the tab 120 is aligned with the corresponding portion 134 and the mating edges 116, 118 of the respective sections are translated toward each other. The lip 162 engages and travels along bonding surface 164 toward channel 166, slightly deflecting bonding tab 120 until the lip 162 is received in channel 166, such as shown in FIG. 3.

The bonding tabs 120, and more particularly the exterior surfaces 124 thereof, may be configured to achieve an interfit of any desired configuration with the corresponding portions 134 of the second skin section 114, for example by including other surface features adapted to mate or interfit, such as to assure that the respective bonding surfaces are maintained in registration with each other.

Figure 4:
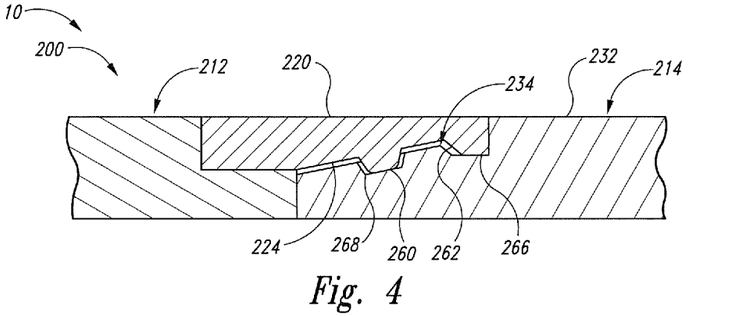
FIG. 4 is a partially schematic, cross-sectional view of another example composite panel and bonding tab configuration in accordance with the present disclosure.

An example configuration of such other features is shown, for example, in FIG. 4. In FIG. 4, a partially-schematic, cross-sectional view of another example composite panel and bonding tab configuration of a structural panel assembly 10 is shown in the form of an aircraft fuselage assembly 200. Assembly 200 includes first and second skin section 212, 214 disposed in edgewise alignment with a bonding tab 220 of the first skin section 212 having an exterior surface 224 interfitting with a corresponding portion 234 of the interior surface 232 of the second skin section 214.

In addition to a channel 266 adapted to receive a lip 262 on the distal end of the tab 220, however, interior surface 232 also includes one or more detents 268 arranged and adapted to receive other protrusions 260 disposed on the exterior surface 224 of the bonding tab 220. Of course, other configurations are possible and within the scope of this disclosure.

Returning to FIG. 2, tab 120 is shown to include two injection holes 142 through which a bonding material 40 (not shown) may be injected to bond the tab 120 (or, more particularly, the exterior surface 124 thereof) to the corresponding portion 134 of the interior surface 132 of the second skin section 114, to thereby join the first and second skin sections 112, 114. Each injection hole 142 is shown to be surrounded by a plurality of verification holes 144, for verification of injection of bonding material. As noted above, any appropriate number, configuration, and/or spacing of injection holes 142 and/or verification holes 144 may be provided on the bonding tab 120. For example, although tab 120 is shown to include two injection holes 142, another bonding tab (such as another of the plurality of bonding tabs, of which the bonding tab 120 shown in FIG. 2 is an example) having a greater width may include more than two injection holes 142 (and corresponding groups of verification holes 144), whereas a bonding tab having a smaller width may only include one injection hole 142 (and one group of verification holes 144), and so forth.

The disposition, configuration, number, spacing, and other characteristics of bonding tabs, such as tab 120, extending from the mating edge 116 of the first skin section 112, may be configured as suitable to the application. For example, the bonding tabs may be disposed relative to the configuration of the mating edge 118 of the second skin section 114, and/or of structural components mounted to the second skin section 114 proximate to the mating edge 118, and so forth. In FIG. 2, for example, the second skin section 114 is shown to include structural components 150 in the form of stiffeners 170 that are disposed longitudinally along the interior surface 132 of the second skin section. (Although not shown in this view, the first skin section 112 may have a similar disposition of stiffeners 170 and/or other structural components 150 mounted thereto.) Although other configurations are possible, stiffeners 170 are shown to have a hat-shaped cross-section, with a central raised section 172 extending from two flange sections 174, and are generally adapted to reinforce the second skin section 114. Each stiffener 170 is shown to include an end portion 176 that extends toward or is disposed proximate to the mating edge 118 of the second skin section 114. Accordingly, tab 120 is shown to have a width sized to fit between the end portions 176 of adjacent stiffeners 170.

Somewhat similarly, other tabs 120 of a plurality of tabs may have widths sized to fit between adjacent stiffeners 170 or other elongate reinforcing beams, or other structural components 150 mounted proximate to the mating edge 118 of second skin section. Such components 150 may be regularly and/or irregularly disposed relative to the mating edge 118 of the second skin section 114, and thus the bonding tabs 120 extending from mating edge 116 of the first skin section 112 may accordingly have regular and/or irregular widths, such as to fit between adjacent stiffeners 170 and/or to otherwise correspond with the arrangement of such components 150.

Figure 5:
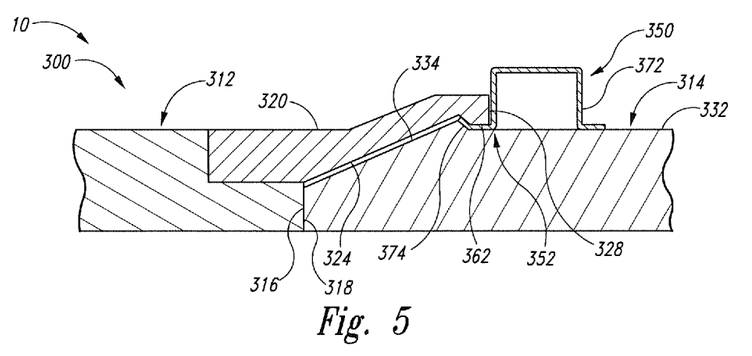
FIG. 5 is a partially schematic, cross-sectional view of yet another example composite panel and bonding tab configuration in accordance with the present disclosure.

Optionally, as noted above, one or more structural components 150 may be configured to interfit with part of a tab, such as tab 120. FIG. 5, for example, shows a partially-schematic, cross-sectional view of yet another example composite panel and bonding tab configuration of a structural panel assembly 10, which is shown in the form of an aircraft fuselage assembly 300. In assembly 300, first and second skin sections 312, 314 are disposed in edgewise alignment, with a bonding tab 320 of the first skin section 312 having an exterior surface 324 interfitting with a corresponding portion 334 of the interior surface 332 of the second skin section 314. Additionally, second skin section 314 includes a structural component 350 mounted thereto in the form of a frame 372, a type of reinforcing beam that typically extends laterally, or radially, along the interior surface 332 of second skin section 314 (as opposed to longitudinally, as is typically the orientation of stiffeners, such as stiffeners 170 in FIG. 2). Accordingly, frame 372 extends laterally along the second skin section 314, proximate to the mating edge 318 thereof.

In FIG. 5, a portion 352 of the frame 372, in the form of a flange 374 disposed on the side of the frame 372 proximate the mating edge 316, is adapted to interfit with lip 362 disposed on the distal edge 328 of the bonding tab 320. More specifically, flange 374 is shown to have a channel-shaped cross-section adapted to correspond to the shape of the lip 362.

In FIGS. 3-5, the injection holes 142 and verification holes 144 that are illustrated in FIG. 2 are not specifically shown, but may be provided in accordance with the aforementioned principles, such as to provide for the injection, and subsequent verification of injection, of bonding material between the respective surfaces, components, and parts to be bonded.

As noted above, the various types of interfitting structure and configurations of the respective first and second skin sections may take a variety of forms, to some extent depending on the configuration of reinforcing structure mounted to the interior surfaces of the sections. The manner of interfitting may be any adapted to assist maintaining a desired spaced relationship between respective surfaces to be bonded. Optionally, the interfit may provide a mechanical engagement that strengthens or otherwise augments the bond achieved by use of the bonding material, and so forth. For example, although the components of the example assemblies 100, 200, and 300 are configured to interfit in the form of a snap fit engagement, other examples consistent with the present disclosure may be adapted to achieve a different type of engagement. In one such example, the bonding tabs 20 and corresponding portions 34 may be configured to interfit in a twist-lock or other manner of rotational engagement, involving translation of the two composite panels 12, 14 together, followed by rotation of one to the other in order to achieve a fit in which the relative bonding surfaces of the panels are maintained in facing registration.

Figure 6:
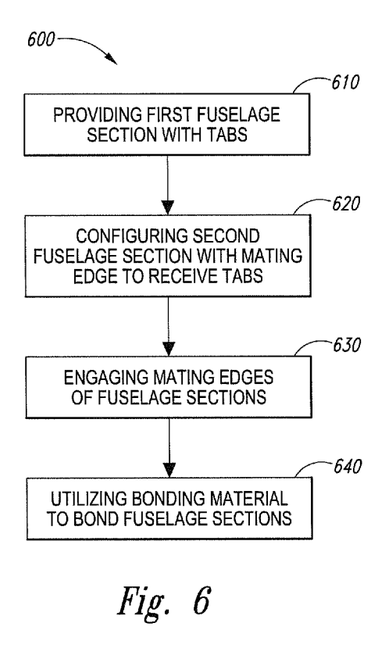
FIG. 6 is a flowchart depicting illustrative, non-exclusive examples of methods of joining composite structural panels or sections in accordance with the present disclosure.

FIG. 6 schematically provides a flowchart that represents illustrative, non-exclusive examples of methods 600 of producing the above-described structural assemblies, according to the present disclosure, such as by joining composite panels. As noted above, the structural composite panels may form skin sections for an aircraft, such as fuselage sections, or entire barrel sections, that may be joined together by use of the tabs and bonding material. As such, although the methods 600 are shown in FIG. 6 and described below in the context of an aircraft fuselage assembly (such as assembly 100, 200, or 300, and so forth) assembled from fuselage sections (such as skin sections 112, 114, 212, 214, 312, 314, and so forth), the steps, actions, and concepts discussed in methods 600 are applicable to any structural panel assembly (such as structural panel assembly 10) assembled from composite panels (such as first and second composite panels 12, 14).

That said, not all methods 600 according to the present disclosure are required to include the steps shown and described herein. The methods 600 and steps illustrated in FIG. 6 are not limiting and other methods and steps are within the scope of the present disclosure, including methods having greater or fewer than the number of steps illustrated, and/or performed in a different order than as presented in FIG. 6, as understood from the discussions herein.

Briefly, methods 600 may include providing, or fitting, a first fuselage section with tabs extending longitudinally from a mating edge thereof, at 610, and configuring a second fuselage section with a corresponding mating edge adapted to matingly receive the tabs and mating edge of the first fuselage section, at 620. At 630, the methods 600 may include engaging the mating edges of the first and second fuselage sections in edgewise alignment, and at 640, the methods 600 may include utilizing a bonding material to bond the first fuselage section to the second fuselage section.

At 610, the providing/fitting step optionally may include forming the tabs, such as to be continuous with the first fuselage section, or separately therefrom. In the former case, methods 600 may include, at 610, fabricating the first fuselage section and shaping the tabs from the fabricated section (such as by cutting away excess material). Optionally, the tabs may be shaped into their final form as the fuselage section is formed, or in other words as part of the forming of the first fuselage section. In the latter case, the tabs may be fabricated as separate components, and may be formed of one or more of the same composite materials from which the fuselage section is formed, or different materials. In some methods 600, the providing, at 610, may include a combination of forming some of the tabs integrally with the fuselage section, and forming others of the tabs separately.

If formed separately from the first fuselage section, the providing/fitting step in 610 optionally may include bonding the tabs to the first fuselage section, such as during fabrication of the first fuselage section. An example bonding technique may include incorporating at least a portion of the tabs, for example a proximal end, within the composite materials from which the first fuselage section are fabricated. For example, in methods 600 in which the first fuselage section is fabricated by depositing plies of composite materials on a mandrel, the step in 610 may include positioning the tabs relative to the mandrel such that composite plies bond the tabs in place.

Further, different techniques in the fabrication process may be employed depending on the desired configuration of separately formed tabs relative to the fuselage section into which the tabs are incorporated. For example, the structural panel assembly 100 in FIGS. 2 and 3 illustrate a bonding tab 120 with a proximal end portion fully incorporated within skin section 112. Such a configuration may be produced in a fabrication technique in which the skin section is partially formed, then the bonding tab is placed in position, and then additional composite plies are layered over the proximal end of the bonding tab. In contrast, the structural panel assemblies 200, 300 in FIGS. 4 and 5, respectively, illustrate bonding tabs 220, 320 having top/interiors surfaces with portions thereof indicated to be substantially flush with the top/interior surface of the respective skin section 212, 312. Such a configuration may be produced in a fabrication technique in which the skin section is substantially fully formed, such as with temporary insets in place to define regions to receive the proximal ends of bonding tabs, followed by removing the insets, and attaching the bonding tabs in the respective regions. Of course, the example techniques briefly described above are simplified, and may include additional or alternative processing steps.

At 620, the configuring step optionally may include configuring at least a portion of an interior surface of the second fuselage section to matingly receive an exterior surface of at least one tab, such as by providing at least one recessed area in a portion of an interior surface of the second fuselage section that is adapted to matingly receive an exterior surface of at least one tab.

As described above, the mating structure of the tabs and corresponding portions may be as desired to achieve an interfit in which two surfaces to be bonded are held in facing registration with each other. As such, methods 600 optionally may include appropriate steps by which the relative structure may be formed. For example, in 610, the providing or fitting step optionally may include forming at least one tab with a protrusion extending substantially orthogonally from an exterior surface thereof (such as a lip disposed on a distal end or edge of the tab, and so forth), and at 620, the configuring step may include configuring at least a portion of the interior surface of the second fuselage section to matingly receive the protrusion of at least one tab (such as a channel or other receiving structure).

As such, at 630, the engaging step optionally may include interfitting the at least one portion of the interior surface of the second fuselage section with the protrusion of the at least one tab, such as in a snap fit engagement. Further, as noted above, the engaging step at 630 may include disposing an exterior surface of at least one tab in facing registration with a corresponding portion of an interior surface of the second fuselage section.

Optionally, the engaging step at 630 may involve one or more structural components mounted to the fuselage sections, such as a structural component mounted to the interior surface of the second fuselage section. As noted above, example structural components may include reinforcing beams such as frames, which typically extend laterally relative to a fuselage section, and/or stiffeners, which typically extend longitudinally relative to a fuselage section. Accordingly, methods 600 optionally may include, for example at 610, forming at least one tab with a protrusion extending substantially orthogonally from an exterior surface thereof and adapted to interfit with at least a portion of a structural component (for example, a flange disposed on a side of a frame proximate the mating edge of the second fuselage section), and at 630, interfitting the protrusion of the at least one tab with the portion of the structural component, such as in a snap fit engagement or otherwise.

At 640, the utilizing step optionally may include applying bonding material to one or more portions of the tabs and one or more portions of the mating edge of the second fuselage section, such as to one or more of the bonding surfaces held in facing registration when the first and second fuselage sections are engaged. As noted above, bonding material may be injected through one or more injection holes formed in the bonding tabs; as such, methods 600 optionally may include, in the providing step 610, forming one or more injection holes through each tab for the injection of the bonding material. In such methods, the utilizing step at 640 may include injecting bonding material through the one or more injection holes.

The utilizing step 640 may further include verifying the injection of bonding material; as such, some methods 600 may include, in the providing step 610, forming one or more verification holes through each tab, disposed proximate the one or more injection holes, for verification of the injection of bonding material.

Methods 600, or steps thereof, may be incorporated or otherwise form a part (or parts) of methods of fabricating any of a variety of shell structures, such as an aircraft fuselage.

Figure 7:
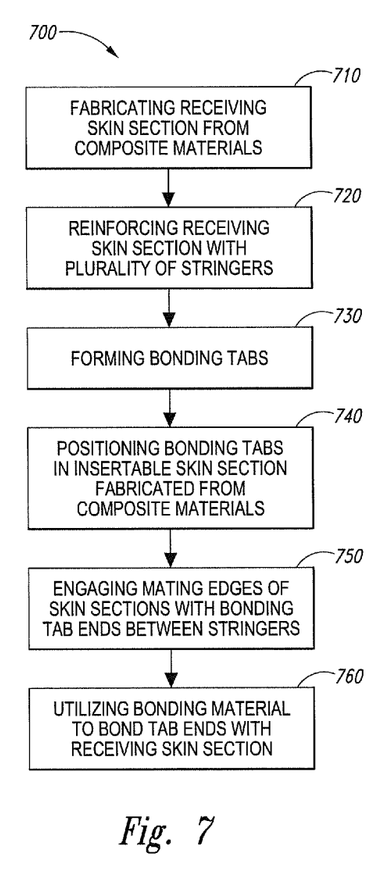
FIG. 7 is a flowchart depicting illustrative, non-exclusive examples of methods of forming an aircraft fuselage in accordance with the present disclosure.

For example, FIG. 7 schematically provides a flowchart that represents illustrative, non-exclusive examples of some methods 700 of forming an aircraft fuselage in accordance with the present disclosure. As noted above, the structural composite panels described herein may form skin sections for an aircraft, such as a fuselage sections, or entire barrel sections, that may be joined together by use of tabs and bonding material. Most of the embodiments and example methods discussed above are described in terms of a first composite panel (or skin section, or fuselage section, and so forth) that includes one or more tabs, and a second composite panel (or skin section, or fuselage section, and so forth) that includes one or more corresponding portions configured to matingly receive and/or interfit with the tabs of the first composite panel. However, as noted above, corresponding mating edges of adjoining composite panel may include a combination of both tabs and corresponding portions. Moreover, structural composite panels according to the present disclosure may include more than one mating edge. In one example in which a composite panel is in the form of a barrel section, the barrel section may include two circumferential mating edges, one on each end of the barrel section. In such an example, both mating edges may be configured to include only bonding tabs, or both may be configured to include only corresponding portions adapted to receive bonding tabs, or both may include a combination of bonding tabs and corresponding portions, and so forth.

For the sake of ease of explanation, methods 700 refer to a composite panel in the form of a skin section (or portion thereof) that has one or more bonding tabs as an insertable skin section. Correspondingly, methods 700 also refer to a composite panel in the form of a skin section (or portion thereof) that is provided with one or more corresponding portions adapted to receive and/or interfit with bonding tabs as a receiving skin section. In light of the foregoing explanation, however, methods 700 are applicable to skin sections and other structural composite panels having a mating edge that includes both bonding tabs and corresponding portions to receive bonding tabs.

Like methods 600, not all methods 700 according to the present disclosure are required to include the steps shown and described herein. The methods 700 and steps illustrated in FIG. 7 are not limiting and other methods and steps are within the scope of the present disclosure, including methods having greater or fewer than the number of steps illustrated, and/or performed in a different order than as presented in FIG. 7, as understood from the discussions herein.

As shown in FIG. 7, methods 700 include, at 710, fabricating a receiving skin section from multiple plies of composite materials, and at 720, reinforcing the receiving skin section with a plurality of stiffeners extending longitudinally toward a mating edge of the receiving skin section. At 730, methods 700 may include forming a plurality of bonding tabs each having an end portion with a width sized to fit between a corresponding adjacent pair of the plurality of stiffeners, and positioning the bonding tabs in an insertable skin section fabricated from multiple plies of composite materials so that end portions of the tabs extend longitudinally from a mating edge of the insertable skin section, at 740. At 750, methods 700 may include engaging the respective mating edges of the receiving skin section and the insertable skin section in edgewise alignment with the end portions of the tabs inserted between the end portions of corresponding adjacent pairs of the plurality of stiffeners. At 760, methods 700 may include utilizing a bonding material to bond the end portions of the tabs with the receiving skin section.

In some methods 700, the engaging step 750 optionally may include disposing exterior surfaces of the end portions of the tabs in facing registration with corresponding portions of an interior surface of the receiving skin section. In such methods, the fabricating step 710 optionally may include forming said corresponding portions of the interior surface of the receiving skin section to matingly receive said exterior surfaces of the end portions of the tabs. Further, the utilizing step 760 may accordingly include bonding the exterior surfaces of the end portions of the tabs with the corresponding portions of the interior surface of the receiving skin section, such as through the use of a bonding material. As noted above, the bonding material may be injected through injection holes provided in the end portions of the tabs, such as may be provided in the forming step 730 or otherwise.

Figure 8:
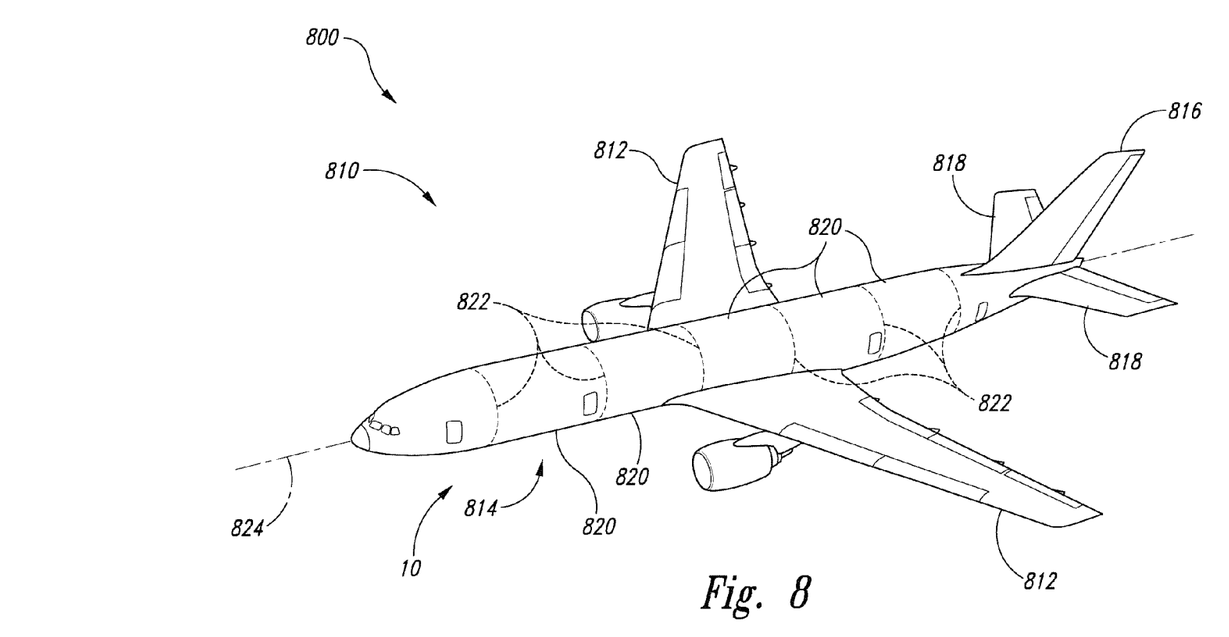
FIG. 8 is a simplified oblique view of an aircraft having a composite fuselage configured in accordance with the present disclosure.

FIG. 8 is a schematic perspective view showing primary structural elements of an aircraft 800 in the form of an airplane 810. In FIG. 8, airplane 810 includes various structural elements such as main wings 812, fuselage 814, vertical fin 816, and horizontal stabilizers 818. Fuselage 814 is further shown to include a plurality of composite barrel sections 820, joined together at a plurality of joints 822 along a longitudinal axis 824 of the airplane 810, such as according to methods 600 and/or 700. That is, aircraft fuselage 814 includes one or more structural panel assemblies 10 (such as aircraft fuselage assembly 100, 200, 300, etc.), consisting of barrel sections 820 (which may in turn includes one or more composite panels 12, 14, skin sections 112, 114, 212, 214, 312, 314, etc.) with mating edges (not individually numbered) configured as shown and described above, such as including a plurality of bonding tabs and/or corresponding portions, and engaged with relative bonding surfaces in facing registration, with bonding material bonding the barrel sections together, at joints 822.

Illustrative, non-exclusive examples of inventive subject matter according to the present disclosure are described in the following enumerated paragraphs:

A. A structural panel assembly comprising:

a first composite panel having a mating edge;

a second composite panel having a corresponding mating edge positioned in edgewise alignment with the mating edge of the first composite panel; and at least one tab disposed on and extending longitudinally from the mating edge of the first composite panel, the tab including an exterior surface in facing registration with a corresponding portion of an interior surface of the second composite panel.

A.1. The panel assembly of paragraph A, wherein the exterior surface of the tab and the corresponding portion of the interior surface of the second composite panel are spaced to receive a bonding material therebetween for attaching the first composite panel to the second composite panel.

A.2. The panel assembly of paragraph A or A.1, wherein the tab includes an injection hole formed therethrough for injection of bonding material.

A.2.1. The panel assembly of paragraph A.2, wherein the tab includes a verification hole formed therethrough, disposed proximate the injection hole, for verification of injection of bonding material.

A.2.2. The panel assembly of paragraph A.2 or A.2.1, wherein the tab includes a plurality of verification holes formed therethrough and disposed proximate the injection hole, for verification of injection of bonding material.

A.3. The panel assembly of any of paragraphs A-A.2.1, wherein the tab includes two or more injection holes formed therethrough and disposed along the tab, each injection hole for injection of bonding material.

A.3.1. The panel assembly of paragraph A.3, wherein the tab includes, for each injection hole, at least one verification hole formed therethrough, for verification of injection of bonding material, disposed proximate the injection hole.

A.4. The panel assembly of any of paragraphs A-A.3.1, further comprising:

bonding material configured to form a bond between the first and second composite panels and disposed between the first and second composite panels.

A.5. The panel assembly of any of paragraphs A-A.4, further comprising:

bonding material configured to form a bond between the first and second composite panels and disposed between the exterior surface of the tab and the corresponding portion of the interior surface.

A.6. The panel assembly of any of paragraphs A-A.5, further comprising:
bonding material configured to form a bond between the first and second composite panels and injected into one or more injection holes formed through the tab.

A.7. The panel assembly of any of paragraphs A-A.6, further comprising:
bonding material forming a bond between the first and second composite panels.

A.8. The panel assembly of any of paragraphs A-A.7, wherein the second composite panel is configured to at least partially interfit with the tab.

A.9. The panel assembly of any of paragraphs A-A.8, wherein the corresponding portion of the interior surface of the second composite panel in facing registration with the exterior surface of the tab includes a recessed area adapted to matingly receive the exterior surface of the tab.

A.10. The panel assembly of any of paragraphs A-A.9, wherein the tab includes a protrusion extending substantially orthogonally from the exterior surface thereof.

A.10.1. The panel assembly of paragraph A.10, wherein the tab includes a distal end, and wherein the protrusion forms a lip disposed on the distal end of the tab.

A.10.2. The panel assembly of paragraph A.10 or A.10.1,
wherein the tab includes a distal end, and
wherein the protrusion forms a lip disposed on the distal edge of the tab.

A.10.3. The panel assembly of any of paragraphs A.10-A.10.2,
wherein the second composite panel includes a structural component mounted to the interior surface thereof, and
wherein the structural component includes a portion interfitting with the protrusion.

A.10.3.1. The panel assembly of paragraph A.10.3,
wherein the structural component is in the form of an elongate reinforcing beam extending proximate to the mating edge of the second composite panel, and
wherein the portion of the structural component interfitting with the protrusion is in the form of a flange disposed on the side of the reinforcing beam proximate the mating edge of the second composite panel.

A.10.3.2. The panel assembly of paragraph A.10.3 or A.10.3.1, wherein the portion of the structural component is adapted to interfit with the protrusion in a snap fit engagement.

A.10.3.3. The panel assembly of paragraph A.10.3.1 or A.10.3.2,
wherein the first and second composite panels form adjoining portions of adjacent first and second fuselage sections of an aircraft, respectively, and
wherein the elongate reinforcing beam is in the form of a frame extending along an interior surface of the second fuselage section.

A.10.4. The panel assembly of any of paragraphs A.10-A.10.3.3, wherein the protrusion interfits with a recessed area disposed on the interior surface of the second composite panel in facing registration with the exterior surface.

A.11. The panel assembly of any of paragraphs A-A.10.4, wherein the second composite panel includes two or more structural components mounted to the interior surface thereof, the structural components each including a portion thereof extending toward the mating edge of the second composite panel, and
wherein the tab has a width sized to fit between said portions of the structural components.

A.11.1. The panel assembly of paragraph A.11,
wherein the structural components are in the form of a pair of parallel elongate reinforcing beams, and
wherein the portions thereof extending toward the mating edge of the second composite panel are end portions of the elongate reinforcing beams.

A.11.2. The panel assembly of paragraph A.11 or A.11.1,
wherein the first and second composite panels form adjoining portions of adjacent first and second fuselage sections of an aircraft, respectively, and
wherein the elongate reinforcing beams are in the form of stiffeners extending along an interior surface of the second fuselage section.

A.12. The panel assembly of any of paragraphs A-A.11.2, wherein the first and second composite panels each further comprises a plurality of plies of composite materials.

A.12.1. The panel assembly of paragraph A.12, wherein the tab also further comprises a plurality of plies of composite materials and is formed continuously with the first composite panel.

A.12.2. The panel assembly of paragraph A.12, wherein the tab also further comprises a plurality of plies of composite materials that are separate and distinct from the plies of composite materials of the first composite panel.

A.12.3. The panel assembly of paragraph A.12, wherein the tab is a separate component that is incorporated into the plurality of plies of composite materials forming the first composite panel.

A.13. The panel assembly of any of paragraphs A-A.12.3, wherein the first and second composite panels form adjoining portions of adjacent first and second sections of a vehicle body.

A.14. The panel assembly of any of paragraphs A-A.12.3, wherein the first and second composite panels are adjacent first and second sections of a vehicle body.

A.15. The panel assembly of any of paragraphs A-A.12.3, wherein the first and second composite panels form adjoining portions of adjacent first and second sections of an aircraft.

A.16. The panel assembly of any of paragraphs A-A.12.3, wherein the first and second composite panels are adjacent first and second sections of an aircraft.

A.17. The panel assembly of any of paragraphs A-A.12.3, wherein the first and second composite panels form adjoining portions of adjacent first and second skin sections of an aircraft fuselage.

A.18. The panel assembly of any of paragraphs A-A.12.3, wherein the first and second composite panels are adjacent first and second skin sections of an aircraft fuselage.

A.19. The panel assembly of any of paragraphs A-A.12.3 or A.18, wherein the first and second composite panels are adjacent first and second barrel sections of an aircraft fuselage.

A.20. A vehicle body incorporating the panel assembly of any of paragraphs A-A.19.

A.20.1. A vehicle incorporating the vehicle body of paragraph A.20.

A.20.1.1. The vehicle of paragraph A.20.1, wherein the vehicle is an aircraft.

A.21. The use of the panel assembly of any of paragraphs A-A.20.1.1 in a vehicle or part of portion thereof.

A.22. The use of the panel assembly of any of paragraphs A-A.20.1.1 in an aircraft or part of portion thereof.

A.23. A method of producing of the panel assembly of any of paragraphs A-A.19.

A.23.1. The method of paragraph A.23, wherein the method includes any of the steps recited in any of paragraphs C-C.13.2.1 or D-D.1.2.2.

B. An aircraft fuselage assembly comprising:

first and second skin sections each further comprising a plurality of plies of composite materials and having a mating edge, with the mating edges disposed in edgewise alignment with each other;

a plurality of tabs each extending longitudinally from the mating edge of the first skin section along an interior surface of the second skin section, each tab including an exterior surface in facing registration with a corresponding portion of the interior surface of the second skin section, each of said tabs further including at least one injection hole formed therethrough for injection of bonding material between said exterior surface and said corresponding portion for attaching the first and second skin sections.

B.1. The assembly of paragraph B, further comprising bonding material configured to form a bond between the first and second skin sections and disposed between the exterior surface of at least one of said tabs and the corresponding portion of the interior surface of the second skin section.

B.2. The assembly of paragraph B or B.1, wherein each of said tabs further includes at least one verification hole formed therethrough and disposed proximate the injection hole, for verification of injection of bonding material.

B.3. The assembly of any of paragraphs B-B.2, wherein each of said tabs includes a width and a plurality of injection holes each formed through the tab, and wherein the injection holes are disposed along the width of each tab.

B.3.1. The assembly of paragraph B, wherein the injection holes are disposed along the width of each tab according to a spacing corresponding to the expected flow of a quantity of bonding material injected through each injection hole.

B.4. The assembly of any of paragraphs B.2-B.3.1, wherein each of the at least one verification hole is disposed relative to the corresponding injection hole according to a spacing corresponding to the expected flow of a quantity of bonding material injected through each injection hole.

B.5. The assembly of any of paragraphs B-B.4, wherein the interior surface of the second skin section is configured to at least partially interfit with the plurality of tabs.

B.6. The assembly of any of paragraphs B-B.5, wherein at least one of said corresponding portions includes a recessed area adapted to matingly receive the exterior surface of at least one of the plurality of tabs.

B.7. The assembly of any of paragraphs B-B.6, wherein at least one of the plurality of tabs includes a protrusion extending substantially orthogonally from the exterior surface thereof.

B.7.1. The assembly of paragraph B.7, wherein the protrusion forms a lip disposed on a distal end of the at least one tab.

B.7.2. The assembly of paragraph B.7 or B.7.1, wherein the protrusion forms a lip disposed on a distal edge of the at least one tab.

B.7.3. The assembly of any of paragraphs B.7-B.7.2, wherein the second skin section includes a frame mounted to the interior surface thereof, the frame having a portion interfitting with the protrusion.

B.7.3.1. The assembly of paragraph B.7.3, wherein the portion of the frame is a flange disposed on the side of the frame proximate the mating edge of the second skin section.

B.7.3.2. The assembly of paragraph B.7.3 or 8.7.3.1, wherein the flange interfits with the protrusion in a snap fit engagement.

B.7.4. The assembly of any of paragraphs B.7-B.7.2, wherein the protrusion interfits with a recessed area disposed on the interior surface of the second skin section in facing registration with the exterior surface.

B.8. The assembly of any of paragraphs B-B.7.4, wherein the second skin section includes at least two stiffeners longitudinally mounted to the interior surface thereof, each stiffener having an end portion extending to, or toward, the mating edge of the second skin section, and wherein at least one of the plurality of tabs has a width sized to fit between the end portions of two adjacent stiffeners of the at least two stiffeners.

B.9. The assembly of any of paragraphs B-B.8, wherein the second skin section includes a plurality of stiffeners each longitudinally mounted to the interior surface thereof, each of the plurality of stiffeners having an end portion extending to, or toward, the mating edge of the second skin section, and wherein the first skin section includes a corresponding plurality of tabs each having a width and disposed relative to the end portions of adjacent stiffeners so that each of the plurality of tabs is adapted to fit between the end portions of corresponding adjacent stiffeners.

B.10. The assembly of any of paragraphs B-B.9, wherein at least some of the plurality of tabs also further comprise a plurality of plies of composite materials.

B.11. The assembly of any of paragraphs B-B.10, wherein at least some of the plurality of tabs are formed continuously with the first skin section.

B.12. The assembly of any of paragraphs B-B.9, wherein at least some of the plurality of tabs are separate components incorporated into the plurality of plies of composite materials forming the first skin section.

B.13. The assembly of any of paragraphs B-B.12, wherein at least one of the skin sections is a barrel section, and wherein the mating edge of the at least one barrel section is a circumferential mating edge.

B.14. An aircraft fuselage incorporating the structural panel assembly of any of paragraphs A-A.18 and/or the aircraft fuselage assembly of any of paragraphs B-B.13.

B.15. An aircraft incorporating the fuselage of paragraph B.14.

B.16. The use of aircraft fuselage assembly of any of paragraphs B-B.13 in an aircraft.

B.17. A method of producing of the aircraft fuselage assembly of any of paragraphs B-B.13.

B.17.1. The method of paragraph B.17, wherein the method includes any of the steps recited in any of paragraphs C-C.13.2.1 or D-D.1.2.2.

C. A method of joining aircraft fuselage sections fabricated from composite materials, the method comprising:

fitting a first fuselage section with tabs extending longitudinally from a mating edge thereof;

configuring a second fuselage section with a corresponding mating edge adapted to matingly receive the tabs and mating edge of the first fuselage section;

engaging the mating edges of the first and second fuselage sections in edgewise alignment; and utilizing a bonding material to bond the first fuselage section to the second fuselage section.

C.1. The method of paragraph C, wherein the fitting further includes forming the tabs.

C.2. The method of paragraph C or CA, wherein the fitting further includes forming the tabs continuously with the first fuselage section.

C.3. The method of any of paragraphs C-C.2, wherein the fitting further includes:

fabricating the first fuselage section, and shaping the tabs from the fabricated first fuselage section.

C.3.1. The method of paragraph C.3,
wherein the fabricating includes fabricating the first fuselage section to have an initial length that is at least as great as a first final length of the first fuselage section combined with a second final length of the tabs, and
wherein the shaping includes forming the tabs to have said first final length, thereby shortening the first fuselage section to have said second final length.

C.4. The method of paragraph C, wherein the fitting further includes forming the tabs separately from the first fuselage section.

C.4.1. The method of paragraph C.4, wherein the forming includes fabricating the tabs from a material different than the composite materials from which the first fuselage section is fabricated.

C.4.2. The method of paragraph C, wherein the forming includes fabricating the tabs from one or more of the same composite materials from which the first fuselage section is fabricated.

C.4.3. The method of any of paragraphs C-C.4.2, wherein the fitting further includes bonding the tabs to the first fuselage section.

C.4.4. The method of any of paragraphs C-C.4.3, wherein the fitting further includes bonding the tabs to the first fuselage section during the fabrication of the first fuselage section.

C.4.4.1. The method of paragraph C.4.4, wherein the bonding includes incorporating at least a portion of the tabs within the composite materials from which the first fuselage section are fabricated.

C.5. The method of any of paragraphs C-C.4.4.1, wherein the configuring includes configuring at least a portion of an interior surface of the second fuselage section to matingly receive an exterior surface of at least one tab.

C.6. The method of any of paragraphs C-C.5, wherein the configuring includes fitting at least one recessed area in a portion of an interior surface of the second fuselage section that is adapted to matingly receive an exterior surface of at least one tab.

C.7. The method of any of paragraphs C-C.6,
wherein the fitting includes forming at least one tab with a protrusion extending substantially orthogonally from an exterior surface thereof, and
wherein the configuring further includes configuring at least a portion of the interior surface of the second fuselage section to matingly receive the protrusion of at least one tab.

C.7.1. The method of paragraph C.7, wherein the protrusion forms a lip disposed on a distal end of the tab.

C.7.2. The method of paragraph C.7 or C.7.1, wherein the protrusion forms a lip disposed on a distal edge of the tab.

C.7.3. The method of any of paragraphs C.7-C.7.2, wherein the engaging includes interfitting the at least one portion of the interior surface of the second fuselage section with the protrusion of the at least one tab in a snap fit engagement.

C.8. The method of any of paragraphs C-C.7.3, wherein the engaging includes disposing an exterior surface of at least one tab in facing registration with a corresponding portion of an interior surface of the second fuselage section.

C.9. The method of any of paragraphs C-C.8,
wherein the second fuselage section includes at least one structural component mounted to the interior surface thereof, and
wherein the fitting includes forming at least one tab to be adapted to engage the structural component when the mating edges of the first and second fuselage sections are engaged in edgewise alignment.

C.10. The method of any of paragraphs C-C.9,
wherein the second fuselage section includes at least one structural component mounted to the interior surface thereof,
wherein the fitting includes forming at least one tab with a protrusion extending substantially orthogonally from an exterior surface thereof and adapted to interfit with at least a portion of the structural component, and
wherein the engaging further includes interfitting the protrusion of the at least one tab with the portion of the structural component.

C.10.1. The method of paragraph C.10, wherein the interfitting includes engaging in a snap fit engagement.

C.10.2. The method of any of paragraphs C.9-C.10.1,
wherein the structural component is a frame extending along an interior surface of the second fuselage section, and
wherein the portion of the structural component with which the tab is adapted to interfit is a flange disposed on the side of the frame proximate the mating edge of the second fuselage section.

C.11. The method of any of paragraphs C-C.10.2,
wherein the second fuselage section includes two or more structural components mounted to the interior surface thereof, each structural component having an end portion extending to, or toward, the mating edge of the second fuselage section, and
wherein the fitting includes forming at least one tab to have a width sized to fit between the end portions of two adjacent structural components.

C.12. The method of any of paragraphs C-C.11, wherein the utilizing includes applying bonding material to one or more portions of the tabs and one or more portions of the mating edge of the second fuselage section.

C.13. The method of any of paragraphs C-C.12,
wherein the engaging includes disposing an exterior surface of at least one tab in facing registration with a corresponding portion of the interior surface of the second fuselage section, and
wherein the utilizing includes applying bonding material to the exterior surface of the at least one tab and/or to the one or more corresponding portions of the interior surface of the second fuselage section.

C.13.1. The method of paragraph C.13,
wherein the fitting includes forming one or more injection holes through each tab for the injection of the bonding material, and
wherein the utilizing includes injecting bonding material through the one or more injection holes.

C.13.2. The method of paragraph C.13 or C.13.1, wherein the utilizing further includes verifying the application of bonding material.

C.13.2.1. The method of paragraph C.13.2, wherein the fitting includes forming one or more verification holes through each tab, disposed proximate the one or more injection holes, for verification of the injection of bonding material.

D. A method of forming an aircraft fuselage, the method comprising:
fabricating a receiving skin section from multiple plies of composite materials,
reinforcing the receiving skin section with a plurality of stiffeners extending longitudinally toward a mating edge of the receiving skin section,
forming a plurality of bonding tabs each having an end portion with a width sized to fit between a corresponding adjacent pair of the plurality of stiffeners,
positioning the bonding tabs in an insertable skin section fabricated from multiple plies of composite materials so that end portions of the tabs extend longitudinally from a mating edge of the insertable skin section, engaging the respective mating edges of the receiving skin section and the insertable skin section in edgewise alignment with the end portions of the tabs inserted between the end portions of corresponding adjacent pairs of the plurality of stiffeners, and utilizing a bonding material to bond the end portions of the tabs with the receiving skin section.

D.1. The method of paragraph D, wherein the engaging includes disposing exterior surfaces of the end portions of the tabs in facing registration with corresponding portions of an interior surface of the receiving skin section.

D.1.1. The method of paragraph D.1, wherein the fabricating includes forming said corresponding portions of the interior surface of the interior surface of the receiving skin section to matingly receive said exterior surfaces of the end portions of the tabs.

D.1.2. The method of paragraph D.1 or D.1.1, wherein the utilizing includes bonding the exterior surfaces of the end portions of the tabs with the corresponding portions of the interior surface of the receiving skin section.

D.1.2.1. The method of paragraph D.1.2, wherein the forming includes forming one or more injection holes for the injection of bonding material, and/or verification holes for verifying the injection of bonding material, in the end portions of the tabs.

D.1.2.2. The method of paragraph D.1.2, wherein the utilizing includes injecting bonding material through an injection hole formed through the end portion of each tab.

As used herein, the terms "adapted" and "configured" indicate that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft fuselage assembly comprising:

first and second skin sections each further comprising a plurality of plies of composite materials and having a mating edge, with the mating edges disposed in edgewise alignment with each other; and a plurality of tabs each extending longitudinally from the mating edge of the first skin section along an interior surface of the second skin section, each tab including an exterior surface in facing registration with a corresponding portion of the interior surface of the second skin section, each of said tabs further including at least one injection hole formed therethrough for injection of bonding material between said exterior surface and said corresponding portion for attaching the first and second skin sections;

wherein at least one of said corresponding portions includes a recessed area adapted to matingly receive the exterior surface of at least one of the plurality of tabs;

wherein at least one of the plurality of tabs includes a protrusion extending substantially orthogonally from the exterior surface thereof; and wherein the protrusion interfits with the recessed area disposed on the interior surface of the second skin section in facing registration with the exterior surface.

2. The fuselage assembly of claim 1, further comprising bonding material configured to form a bond between the first and second skin sections and disposed between the exterior surface of at least one of said tabs and the corresponding portion of the interior surface of the second skin section.

3. The fuselage assembly of claim 1, wherein each of said tabs further includes at least one verification hole formed therethrough and disposed proximate the injection hole, for verification of injection of bonding material.

4. The fuselage assembly of claim 1, wherein the interior surface of the second skin section is configured to at least partially interfit with the plurality of tabs.

5. The fuselage assembly of claim 1, wherein the protrusion forms a lip disposed on a distal end of the at least one tab.

6. The fuselage assembly of claim 1, wherein the second skin section includes a frame mounted to the interior surface thereof, the frame having a portion interfitting with the protrusion.

7. The fuselage assembly of claim 6, wherein the portion of the frame is a flange disposed on a side of the frame proximate the mating edge of the second skin section.

8. The fuselage assembly of claim 7, wherein the flange interfits with the protrusion in a snap fit engagement.

9. The fuselage assembly of claim 1, wherein at least some of the plurality of tabs are separate components incorporated into the plurality of plies of composite materials forming the first skin section.

10. The fuselage assembly of claim 1, wherein at least some of the plurality of tabs also further comprise a plurality of plies of composite materials.

11. The fuselage assembly of claim 1, wherein the second skin section includes at least two stiffeners longitudinally mounted to the interior surface thereof, each stiffener having an end portion extending to, or toward, the mating edge of the second skin section, and wherein at least one of the plurality of tabs has a width sized to fit between the end portions of two adjacent stiffeners of the at least two stiffeners.

12. An aircraft incorporating the fuselage assembly of claim 11.

13. A vehicle shell assembly comprising: a first composite panel having a mating edge;

a second composite panel having a corresponding mating edge positioned in edgewise alignment with the mating edge of the first composite panel;

and at least one tab disposed on and extending longitudinally from the mating edge of the first composite panel, the tab including an exterior surface in facing registration with a corresponding portion of an interior surface of the second composite panel, the tab further including at least one injection hole formed therethrough
for injection of bonding material between said exterior surface and said corresponding portion for attaching the first composite panel and the second composite
wherein the corresponding portion includes a recessed area adapted to matingly receive the exterior surface of the tab;
wherein the tab includes a protrusion extending substantially orthogonally from the exterior surface of the tab; and wherein the protrusion interfits with the recessed area.

14. The shell assembly of claim 13, wherein the exterior surface of the tab and the corresponding portion of the interior surface of the second composite panel are spaced to receive a bonding material therebetween for attaching the first composite panel to the second composite panel.

15. An aircraft fuselage assembly comprising:
first and second skin sections each further comprising a plurality of plies of composite materials and having a mating edge, with the mating edges disposed in edgewise alignment with each other; and
a plurality of tabs each extending longitudinally from the mating edge of the first skin section along an interior surface of the second skin section, each tab including an exterior surface in facing registration with a corresponding portion of the interior surface of the second skin section, each of said tabs further including at least one injection hole formed therethrough for injection of bonding material between said exterior surface and said corresponding portion for attaching the first and second skin sections;
wherein at least one of said corresponding portions includes a recessed area adapted to matingly receive the exterior surface of at least one of the plurality of tabs;
wherein at least one of the plurality of tabs includes a protrusion extending substantially orthogonally from the exterior surface thereof; and
wherein the protrusion forms a lip disposed on a distal end of the at least one tab.

16. The fuselage assembly of claim 15, wherein the protrusion interfits with the recessed area disposed on the interior surface of the second skin section in facing registration with the exterior surface.

17. The aircraft fuselage of claim 15,
wherein the second skin section includes a frame mounted to the interior surface thereof, the frame having a portion interfitting with the protrusion.

\* \* \* \* \*